US012753805B2

(12) United States Patent
Vigen et al.

(10) Patent No.: US 12,753,805 B2
(45) Date of Patent: Oct. 6, 2026

(54) CLUTCH GUARD

(71) Applicant: Arctic Cat Inc., Thief River Falls, MN (US)

(72) Inventors: David Vigen, Providence, RI (US); Todd MacDonald, Providence, RI (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 19/245,031

(22) Filed: Jun. 20, 2025

(65) Prior Publication Data

US 2025/0389301 A1 Dec. 25, 2025

Related U.S. Application Data

(60) Provisional application No. 63/662,778, filed on Jun. 21, 2024.

(51) Int. Cl.

| | |
|---|---|
| ***F16D 21/08*** | (2006.01) |
| ***B62M 27/02*** | (2006.01) |
| ***F16H 7/02*** | (2006.01) |

(52) U.S. Cl.

CPC ............... *F16D 21/08* (2013.01); *F16H 7/02* (2013.01); *B62M 27/02* (2013.01); *F16D 2300/26* (2013.01)

(58) Field of Classification Search

CPC ........ F16D 21/08; F16D 2300/26; F16H 7/02; F16H 57/035; B62M 27/02; B60Y 2200/252

See application file for complete search history.

(56) References Cited

U.S. PATENT DOCUMENTS

| | | | | |
|---|---|---|---|---|
| 4,671,781 A * | 6/1987 | Tanaka | F16H 57/0412 | 474/93 |
| 4,671,782 A * | 6/1987 | Ochiai | F16H 57/0415 | 474/93 |
| 4,869,708 A * | 9/1989 | Hoffmann | F16H 7/18 | 474/140 |
| 6,238,312 B1 * | 5/2001 | Tsubata | F16H 57/0489 | 474/146 |
| 6,267,700 B1 * | 7/2001 | Takayama | F16H 57/0489 | 474/93 |
| 6,338,688 B1 * | 1/2002 | Minami | F16H 57/035 | 474/146 |

(Continued)

*Primary Examiner* — Henry Y Liu

(74) *Attorney, Agent, or Firm* — Billion & Armitage

(57) ABSTRACT

A clutch assembly includes a first clutch defining a central axis and configured to be coupled to a prime mover of a snowmobile, a second clutch coupled to the first clutch and configured to be coupled to a tractive assembly of the snowmobile, and a clutch guard positioned between the first clutch and the second clutch. The clutch guard includes a guard wall having a curved profile extending at least partially around the first clutch, a first mounting flange positioned at or proximate a first end of the guard wall where the first mounting flange is configured to couple to a first mounting interface, and a second mounting flange positioned at or proximate a second end of the guard wall where the second mounting flange is configured to couple to a second mounting interface. The first mounting flange and the second mounting flange are positioned longitudinally forward of the central axis.

20 Claims, 19 Drawing Sheets

(56) References Cited

U.S. PATENT DOCUMENTS

| | | | | |
|---|---|---|---|---|
| 6,398,683 | B1 * | 6/2002 | Fukuda | B62J 13/00<br>180/230 |
| 7,281,603 | B2 * | 10/2007 | Fukuda | F02B 75/16<br>474/46 |
| 7,303,495 | B2 * | 12/2007 | Schoenek | F16C 35/067<br>74/606 R |
| 7,427,248 | B2 * | 9/2008 | Chonan | F16H 57/0415<br>474/93 |
| 7,556,576 | B2 * | 7/2009 | Mochizuki | F16H 63/067<br>474/18 |
| 7,686,123 | B2 * | 3/2010 | Ishida | F28F 3/12<br>180/311 |
| 7,771,299 | B2 * | 8/2010 | Mochizuki | F16H 9/18<br>180/358 |
| 7,905,803 | B2 * | 3/2011 | Mochizuki | F16H 9/18<br>474/18 |
| 8,382,620 | B2 * | 2/2013 | Morita | F16H 9/18<br>474/144 |
| 8,596,406 | B2 * | 12/2013 | Itoo | F16H 57/0416<br>474/93 |
| 8,613,335 | B2 * | 12/2013 | Deckard | F16H 57/027<br>180/68.1 |
| 8,834,307 | B2 * | 9/2014 | Itoo | F16H 57/0416<br>474/93 |
| 8,840,496 | B2 * | 9/2014 | Yamanishi | B60K 17/08<br>474/93 |
| 8,911,312 | B2 * | 12/2014 | Itoo | F16H 57/0489<br>474/93 |
| 8,950,290 | B2 * | 2/2015 | Dieter | F16H 37/021<br>74/665 GA |
| 9,182,031 | B2 * | 11/2015 | Kouma | F16H 57/031 |
| 9,341,255 | B2 * | 5/2016 | Itoo | F16H 57/027 |
| 9,366,331 | B2 * | 6/2016 | Eberhardt | F16H 9/12 |
| 9,453,573 | B2 * | 9/2016 | Renner | F16H 57/0416 |
| 9,528,595 | B2 * | 12/2016 | Itoo | F16H 57/027 |
| 9,909,659 | B2 * | 3/2018 | Bessho | F16H 9/18 |
| 10,066,728 | B2 * | 9/2018 | Yolitz | F16H 57/0006 |
| 10,179,506 | B2 * | 1/2019 | Yagyu | B60W 10/18 |
| 10,295,045 | B2 * | 5/2019 | Eberhardt | F16H 57/0416 |
| 10,648,554 | B2 * | 5/2020 | Kuhl | F16H 57/0489 |
| 10,697,532 | B2 * | 6/2020 | Schleif | F16H 57/031 |
| 10,774,921 | B2 * | 9/2020 | Ijichi | F16H 57/0489 |
| 11,046,176 | B2 * | 6/2021 | Danielson | B60K 17/22 |
| 11,124,271 | B2 * | 9/2021 | Aitcin | B62M 9/08 |
| 11,578,793 | B2 * | 2/2023 | Nelson | F16H 57/027 |
| 11,624,436 | B2 * | 4/2023 | Laroche | F16H 57/031<br>74/606 A |
| 11,644,093 | B2 * | 5/2023 | Eberhardt | F16H 57/0416<br>474/144 |
| 11,649,889 | B2 * | 5/2023 | Nelson | F16H 57/027<br>474/93 |
| 11,933,399 | B2 * | 3/2024 | Lynn | F16H 57/035 |
| 12,007,014 | B2 * | 6/2024 | Nelson | F16H 57/027 |
| 12,092,198 | B2 * | 9/2024 | Nelson | F16H 57/027 |
| 12,240,319 | B2 * | 3/2025 | Homme | B60G 15/062 |
| 12,504,070 | B2 * | 12/2025 | Truskolaski | F16H 61/12 |
| 2004/0224806 | A1 * | 11/2004 | Chonan | F16H 57/0415<br>474/93 |
| 2004/0259673 | A1 * | 12/2004 | Bertrand | B62J 13/00<br>474/144 |
| 2005/0239591 | A1 * | 10/2005 | Schoenek | F16H 57/035<br>474/144 |
| 2005/0272544 | A1 * | 12/2005 | Ho | F16H 57/035<br>474/144 |
| 2007/0054763 | A1 * | 3/2007 | Mochizuki | F16H 9/18<br>474/18 |
| 2007/0219030 | A1 * | 9/2007 | Ho | F16H 57/0489<br>474/144 |
| 2010/0167853 | A1 * | 7/2010 | Morita | F16H 9/18<br>474/144 |
| 2012/0031693 | A1 * | 2/2012 | Deckard | B23P 6/00<br>180/68.3 |
| 2012/0031694 | A1 * | 2/2012 | Deckard | F16H 57/0489<br>29/402.03 |
| 2012/0137828 | A1 * | 6/2012 | Dieter | F16H 37/021<br>74/665 F |
| 2012/0289370 | A1 * | 11/2012 | Yamanishi | B60K 17/08<br>474/93 |
| 2013/0090198 | A1 * | 4/2013 | Itoo | F16H 57/03<br>474/93 |
| 2013/0090199 | A1 * | 4/2013 | Itoo | F16H 57/0416<br>474/93 |
| 2013/0092468 | A1 * | 4/2013 | Nelson | B60W 30/1882<br>474/43 |
| 2014/0038756 | A1 * | 2/2014 | Lai | F16H 9/12<br>474/28 |
| 2014/0113766 | A1 * | 4/2014 | Yagyu | B60W 10/04<br>903/902 |
| 2014/0187366 | A1 * | 7/2014 | Kouma | F16H 57/035<br>474/8 |
| 2015/0024890 | A1 * | 1/2015 | Eberhardt | F16H 57/031<br>474/144 |
| 2015/0308560 | A1 * | 10/2015 | Itoo | F16H 57/0489<br>474/146 |
| 2015/0308561 | A1 * | 10/2015 | Itoo | F16H 57/027<br>474/146 |
| 2015/0377341 | A1 * | 12/2015 | Renner | F16H 57/0416<br>474/93 |
| 2016/0061314 | A1 * | 3/2016 | Kuhl | F16H 57/0489<br>474/8 |
| 2017/0002920 | A1 * | 1/2017 | Bessho | F16H 57/027 |
| 2017/0043658 | A1 * | 2/2017 | Yagyu | B60K 6/48 |
| 2017/0045131 | A1 * | 2/2017 | Yolitz | F16H 57/0006 |
| 2018/0180163 | A1 * | 6/2018 | Schleif | F16H 57/0415 |
| 2018/0245682 | A1 * | 8/2018 | Davis | F16H 57/027 |
| 2018/0326843 | A1 * | 11/2018 | Danielson | B60J 5/0487 |
| 2019/0285159 | A1 * | 9/2019 | Nelson | F16H 57/027 |
| 2019/0285160 | A1 * | 9/2019 | Nelson | F16H 57/027 |
| 2020/0248793 | A1 * | 8/2020 | Kuhl | F16H 57/027 |
| 2021/0086869 | A1 * | 3/2021 | Aitcin | B62M 27/02 |
| 2021/0380201 | A1 * | 12/2021 | Aitcin | B62D 55/07 |
| 2022/0082167 | A1 * | 3/2022 | Kuhl | F16H 57/027 |
| 2022/0205517 | A1 * | 6/2022 | Lynn | F16H 57/035 |
| 2023/0019039 | A1 * | 1/2023 | Kuhl | F16H 57/027 |
| 2023/0083658 | A1 * | 3/2023 | Nelson | F16H 57/027<br>474/93 |
| 2023/0184318 | A1 * | 6/2023 | Nelson | F16H 57/027<br>474/93 |

* cited by examiner

CLUTCH GUARD

CROSS-REFERENCE TO RELATED PATENT APPLICATION

This application claims the benefit of and priority to U.S. Provisional Patent Application No. 63/662,778, filed Jun. 21, 2024, which is incorporated herein by reference in its entirety.

BACKGROUND

The present application relates to a clutch assembly of a vehicle. More specifically, the present application relates to a clutch guard of a snowmobile.

SUMMARY

One embodiment relates to a clutch assembly for a snowmobile. The clutch assembly includes a first clutch defining a central axis and configured to be coupled to a prime mover of the snowmobile, a second clutch coupled to the first clutch and configured to be coupled to a tractive assembly of the snowmobile, and a clutch guard positioned between the first clutch and the second clutch. The clutch guard includes a guard wall having a curved profile extending at least partially around the first clutch, a first mounting flange positioned at or proximate a first end of the guard wall where the first mounting flange is configured to couple to a first mounting interface, and a second mounting flange positioned at or proximate a second end of the guard wall where the second mounting flange is configured to couple to a second mounting interface. The first mounting flange and the second mounting flange are positioned longitudinally forward of the central axis.

Another embodiment relates to a clutch assembly. The clutch assembly includes a first clutch, a second clutch, a clutch guard positioned between the first clutch and the second clutch, and a belt coupling the first clutch to the second clutch. The clutch guard has a curved profile extending at least partially around the first clutch. The curved profile defines a notch extending at least partially thereal-ong. The belt extends through the notch.

Still another embodiment relates to a clutch device. The clutch device includes a clutch guard configured to be positioned between (a) a first clutch coupled to a prime mover of an off-road vehicle and (b) a second clutch coupled to a tractive assembly of the off-road vehicle. The clutch guard has a curved profile configured to extend at least partially around the first clutch such that a first end and a second end of the curved profile are positioned longitudinally forward of a central axis of the first clutch. The curved profile defines a notch extending at least partially thereal-ong.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a snowmobile) includes a clutch assembly to transfer power from a prime mover to one or more tractive assemblies. The clutch assembly include a primary clutch, a secondary clutch, a belt coupling the primary clutch and the secondary clutch, and a clutch guard assembly. The clutch guard assembly includes one or more mounting interfaces, such as a first mounting interface, a second mounting interface, and/or a third mounting interface to couple the clutch guard assembly to one or more components of the vehicle. The clutch guard assembly includes a guard that defines an arc and/or a tangential path to direct debris along the arc and/or the tangential path in a direction way from a rider and/or operator of the vehicle.

Overall Vehicle

Figure 1:
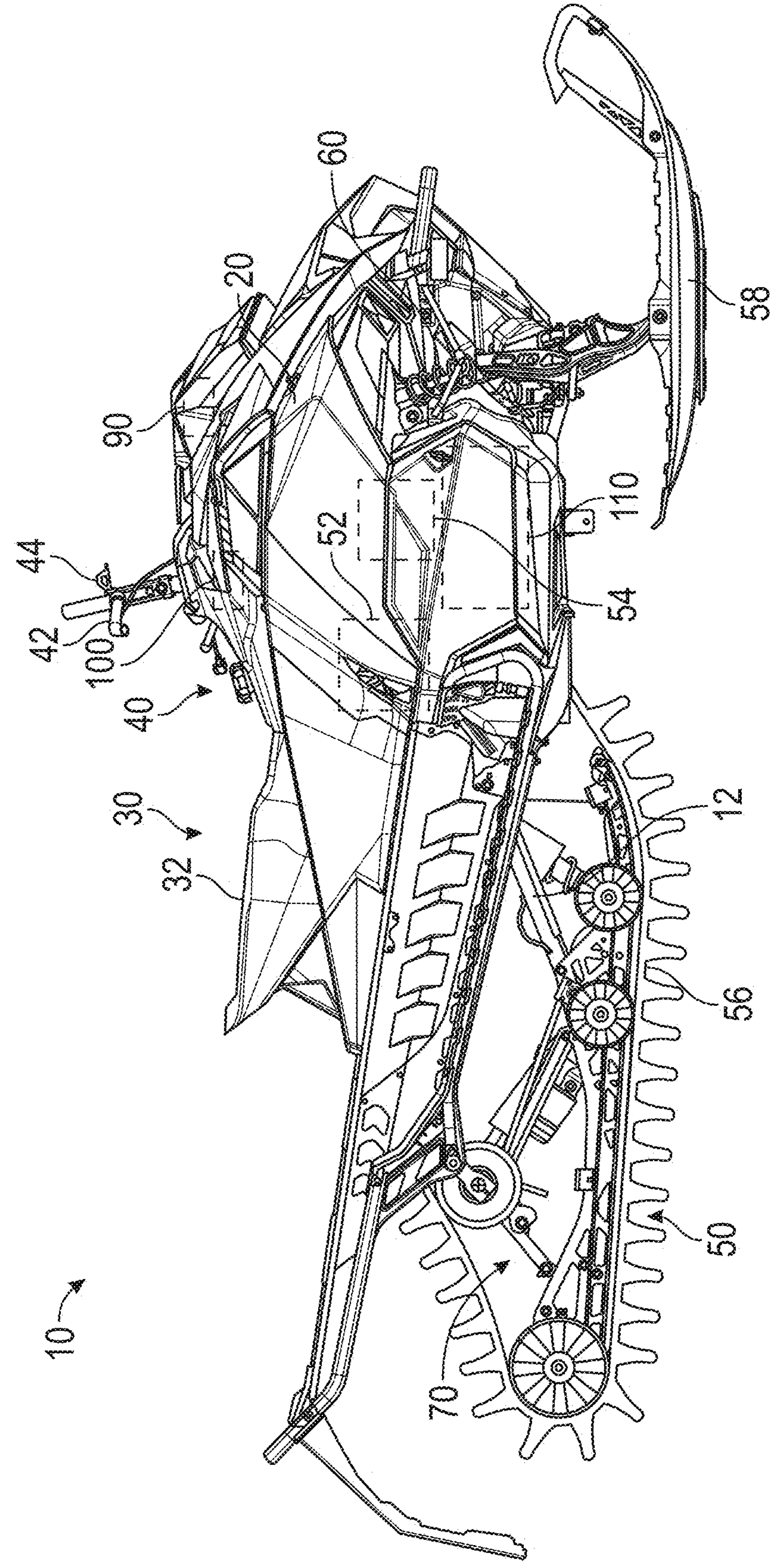
FIG. 1 is a side view of a vehicle, according to an exemplary embodiment.
Figure 2:
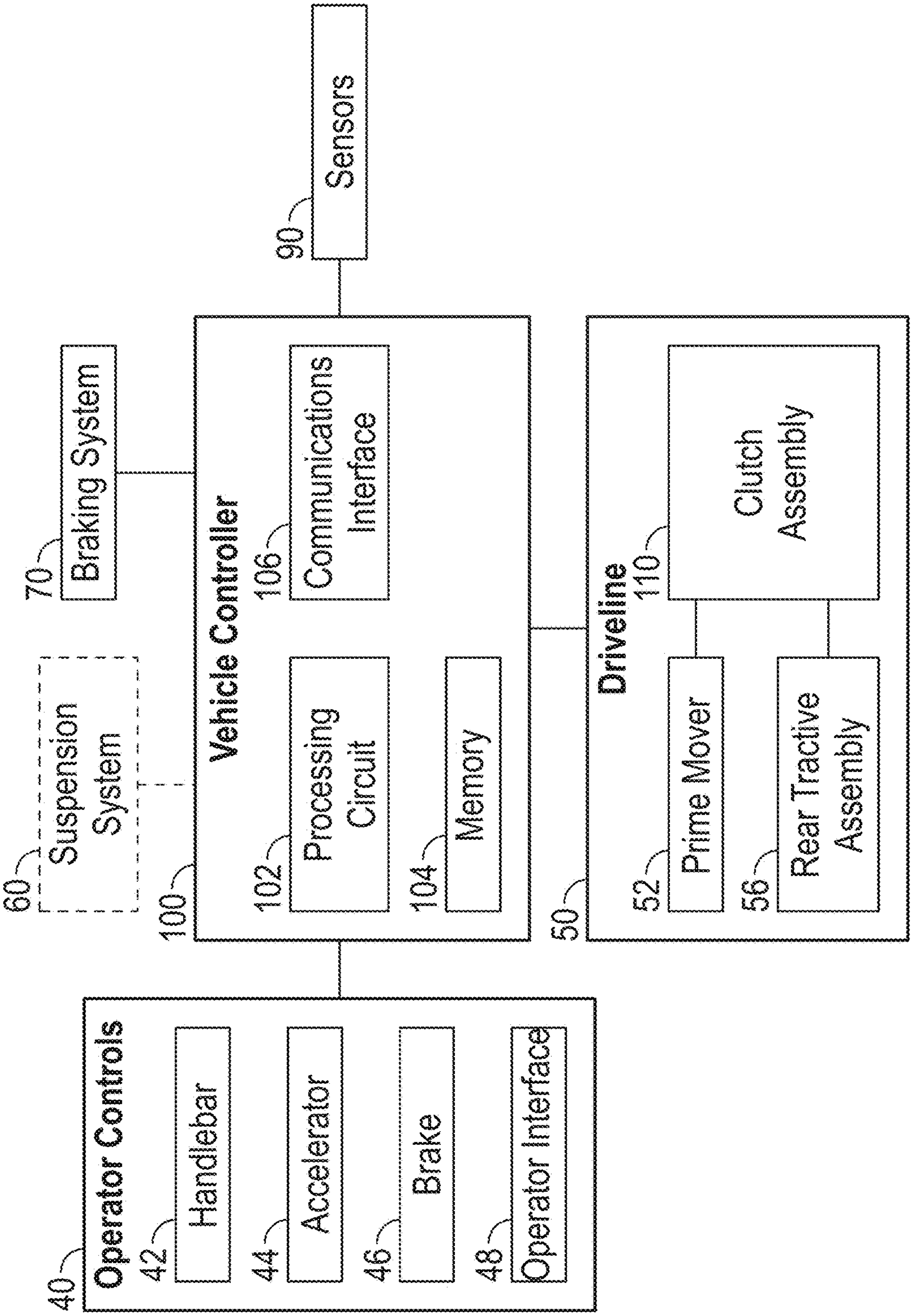
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a vehicle control system, shown as vehicle controller 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is a tracked, winter-focused off-road machine or vehicle configured to be operated on a snowy and/or icy surface (e.g., operated in snow, on ice, etc.). In some embodiments, the tracked, winter-focused off-road machine or vehicle is a lightweight or recreational machine or vehicle such as a snowmobile, a snow bike, a snow scooter, a snow all-terrain vehicle ("ATV"), a snow utility task vehicle ("UTV"), a snow plow machine, and/or another type of lightweight or recreational machine configured to be operated on a snowy and/or icy surface. In other embodiments, the tracked, snow-focused off-road machine or vehicle is a large machine or vehicle such as a snowcat, a snow groomer, a snow plow machine, a tractor, and/or another type of large machine or vehicle configured to be operated on a snowy and/or icy surface. In still other embodiments, the vehicle 10 is a non-tracked, off-road machine or vehicle such as an ATV, a UTV, a dirt bike, and/or another type of non-tracked, off-road machine or vehicle.

According to the exemplary embodiment shown in FIG. 1, the occupant seating area 30 includes a first seat, shown as operator seat 32, configured to support an operator of the vehicle 10. In some embodiments, the occupant seating area 30 includes a double seat configured to support the operator of the vehicle 10 and a passenger of the vehicle 10 behind the operator, or a triple seat configured to support the operator of the vehicle 10 and two passengers of the vehicle 10 behind the operator. In some embodiments, the occupant seating area 30 includes a second seat positioned rearward of or to the side of the operator seat 32. The second seat may be configured to support passengers of the vehicle 10. In some embodiments, in addition to or in place of the second seat, the vehicle 10 includes one or more rear accessories. Such rear accessories may include a ski rack, a bed, a cargo body (e.g., for a storage, etc.), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a handlebar, a steering column, a handlebar assembly, joystick(s), a steering wheel, etc.), shown as handlebar 42, an accelerator interface (e.g., a pedal, a throttle, a throttle lever, etc.), shown as accelerator 44, a braking interface (e.g., a brake pedal, a brake lever, a brake arm, etc.), shown as brake 46, and one or more additional interfaces (e.g., a light control interface, an operational mode interface, etc.), shown as operator interfaces 48. The operator interface 48 may include one or more displays and one or more input devices. The one or more displays may be or include a touchscreen, an LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., tracks, treads, axles, differentials, etc.), shown as rear tractive assembly 56, a second tractive assembly (e.g., skis, runners, slides, etc.), shown as front tractive assembly 58, and a connection system, shown as clutch assembly 110, selectively coupling the prime mover 52 to the rear tractive assembly 56. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

According to the exemplary embodiment shown in FIG. 1, the rear tractive assembly 56 includes a rear tractive element that is configured as a track and the front tractive assembly 58 includes front tractive elements configured as skis. For example, the rear tractive element may be configured as a track configured to engage a snowy surface in order to drive the vehicle 10 and the front skis may be configured to slide or glide along the snowy surface. In some embodiments, the rear tractive assembly 56 includes a plurality of the rear tractive elements configured as tracks. In some embodiments, the front tractive assembly 58 includes front tractive elements that are configured as tracks. In other embodiments, the front tractive assembly 58 and the rear tractive assembly 56 include tractive elements that are configured as wheels.

According to an exemplary embodiment, the prime mover 52 is configured to provide power to drive the rear tractive assembly 56 (e.g., to provide rear-track drive, etc.). In some embodiments, the prime mover 52 is configured to provide power to drive the rear tractive assembly 56 and/or the front tractive assembly 58 (e.g., to provide front-track drive, to provide all-track drive, etc.). In some embodiments, the driveline 50 includes a transmission device (e.g., a gearbox, a continuous variable transmission ("CVT"), etc.) positioned between (a) the prime mover 52 and (b) the rear tractive assembly 56. In a non-track arrangement, the rear tractive assembly 56 may include a drive shaft, a differential, and/or an axle. In such non-track arrangement, the rear tractive assembly 56 includes two axles or a tandem axle arrangement. According to an exemplary embodiment, the front tractive assembly 58 is steerable (e.g., using the handlebar 42). In some embodiments, the rear tractive assembly 56 is additionally or alternatively steerable. In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first of the prime movers 52 that drives a first one of the rear tractive elements and a second of the prime movers 52 that drives a second one of the rear tractive elements when the rear tractive assembly 56 includes two rear tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include one or more rear braking components positioned to facilitate braking one or more components of the rear tractive assembly 56 (e.g., the rear axle, the rear tractive elements, etc.). In some embodiments (e.g., embodiments with two rear tractive elements), the one or more rear braking components include two rear braking components, one positioned to facilitate braking each of the rear tractive elements.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), suspension sensor(s), wheel/track sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 may represent a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle controller 100 is coupled to (e.g., communicably coupled to) components of the operator controls 40 (e.g., the handlebar 42, the accelerator 44, the brake 46, the operator interface 48, etc.), components of the driveline 50 (e.g., the prime mover 52), components of the braking system 70, and the sensors 90. By way of example, the vehicle controller 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Clutch Guard

Figure 3:
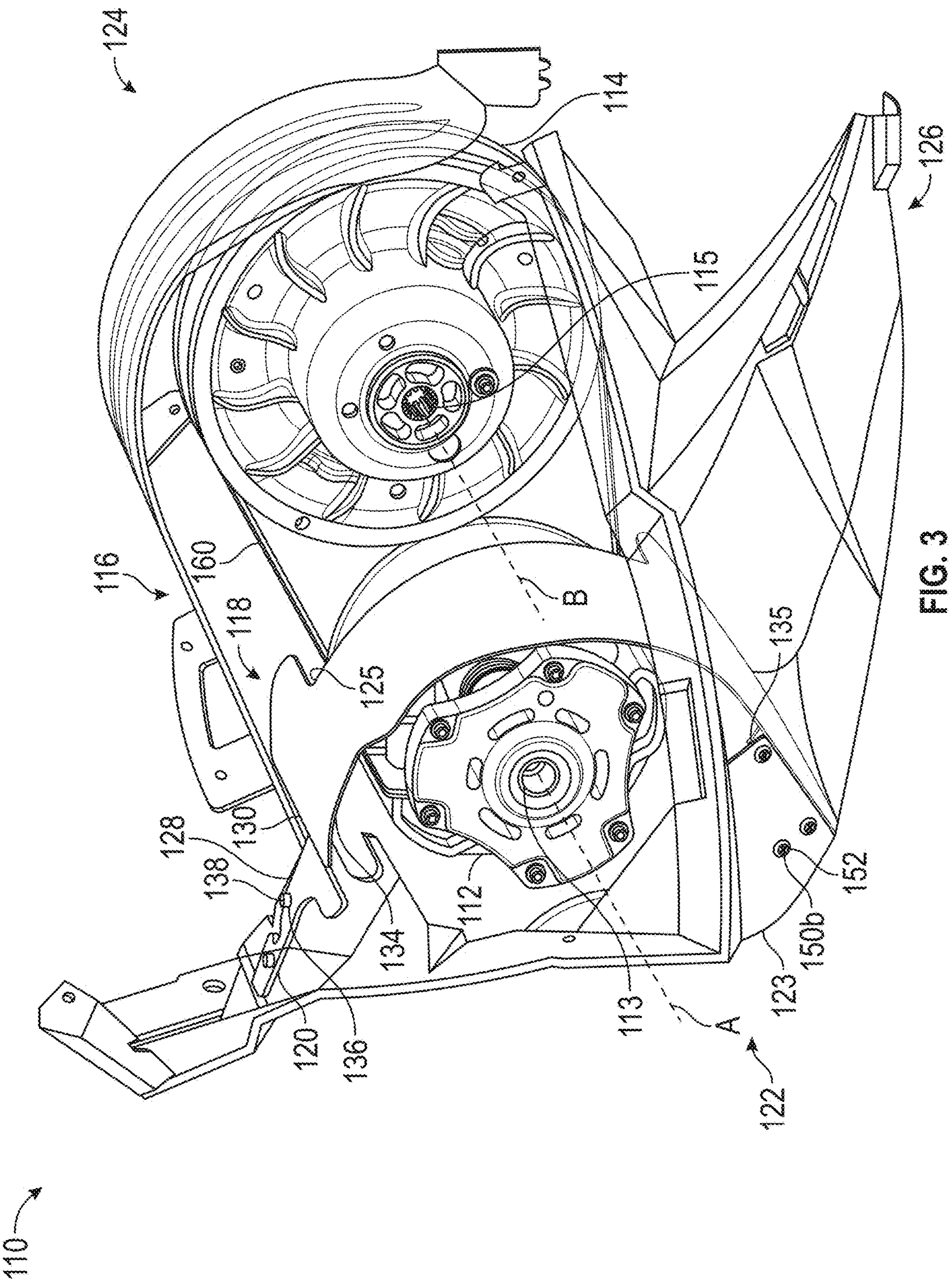
FIG. 3 is a perspective view of a clutch assembly of the vehicle of FIG. 1, according to an exemplary embodiment.
Figure 4:
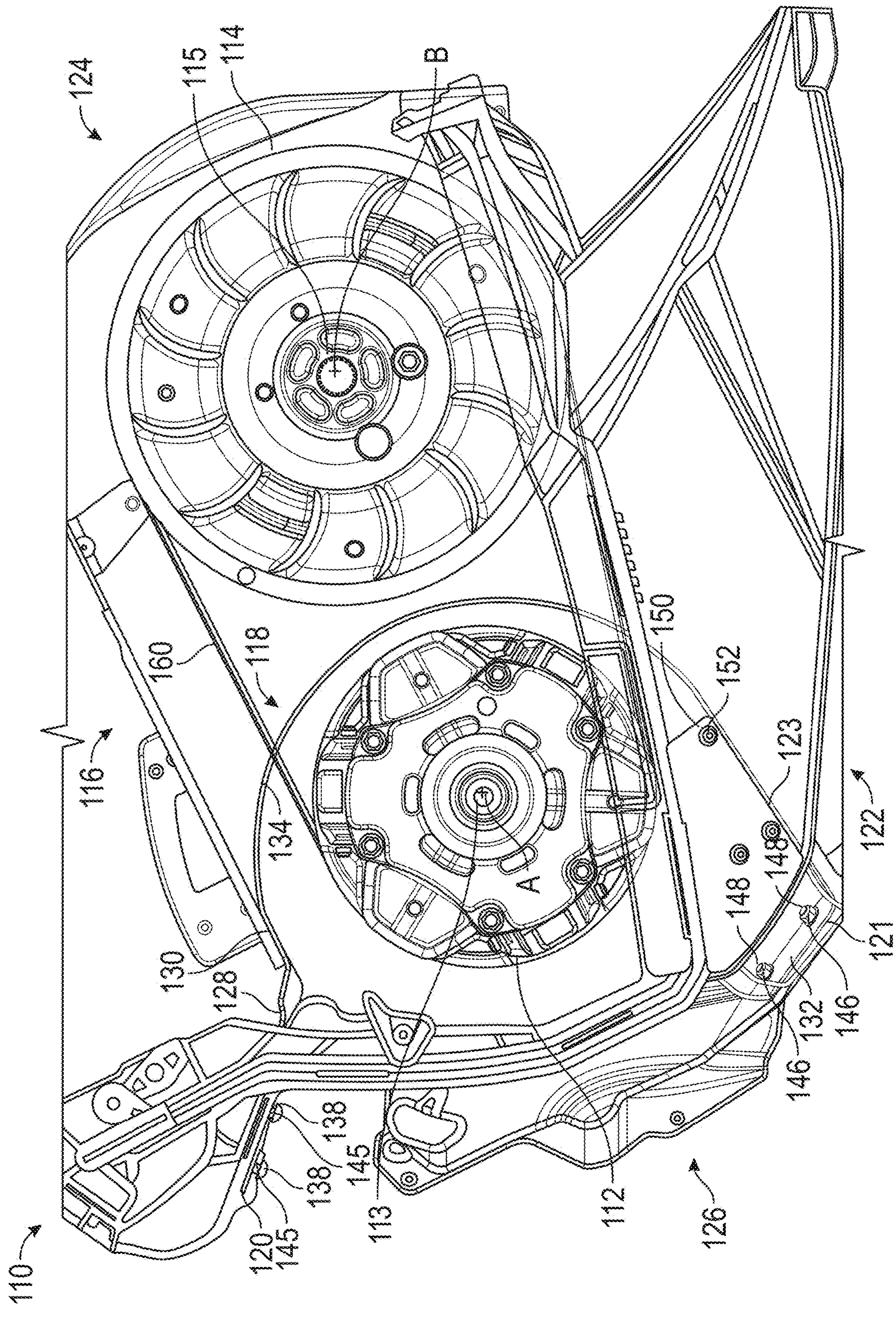
FIG. 4 is a side view of the clutch assembly of FIG. 3, according to an exemplary embodiment.
Figure 5:
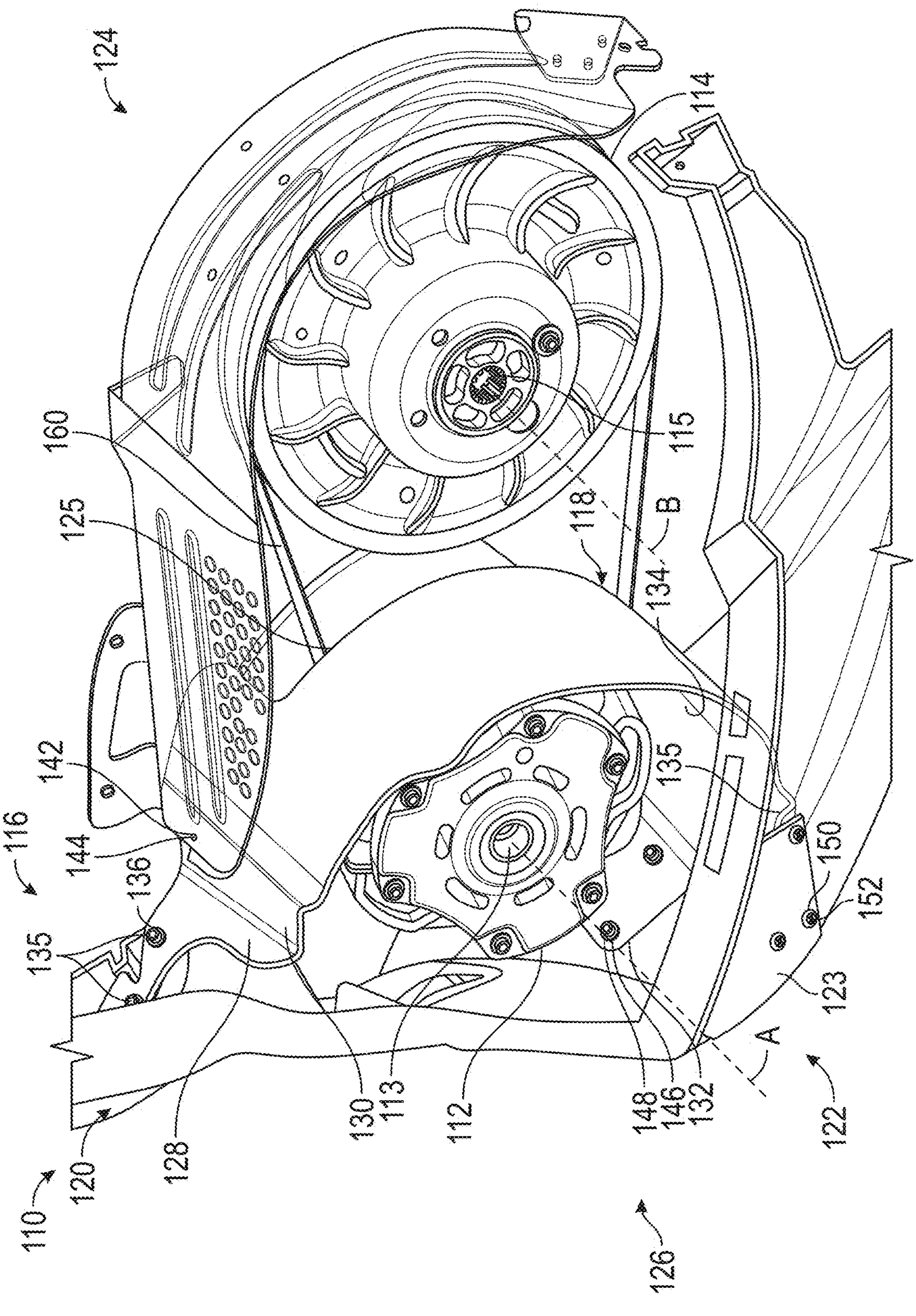
FIG. 5 is another perspective view of the clutch assembly of FIG. 3, according to an exemplary embodiment.
Figure 6A:
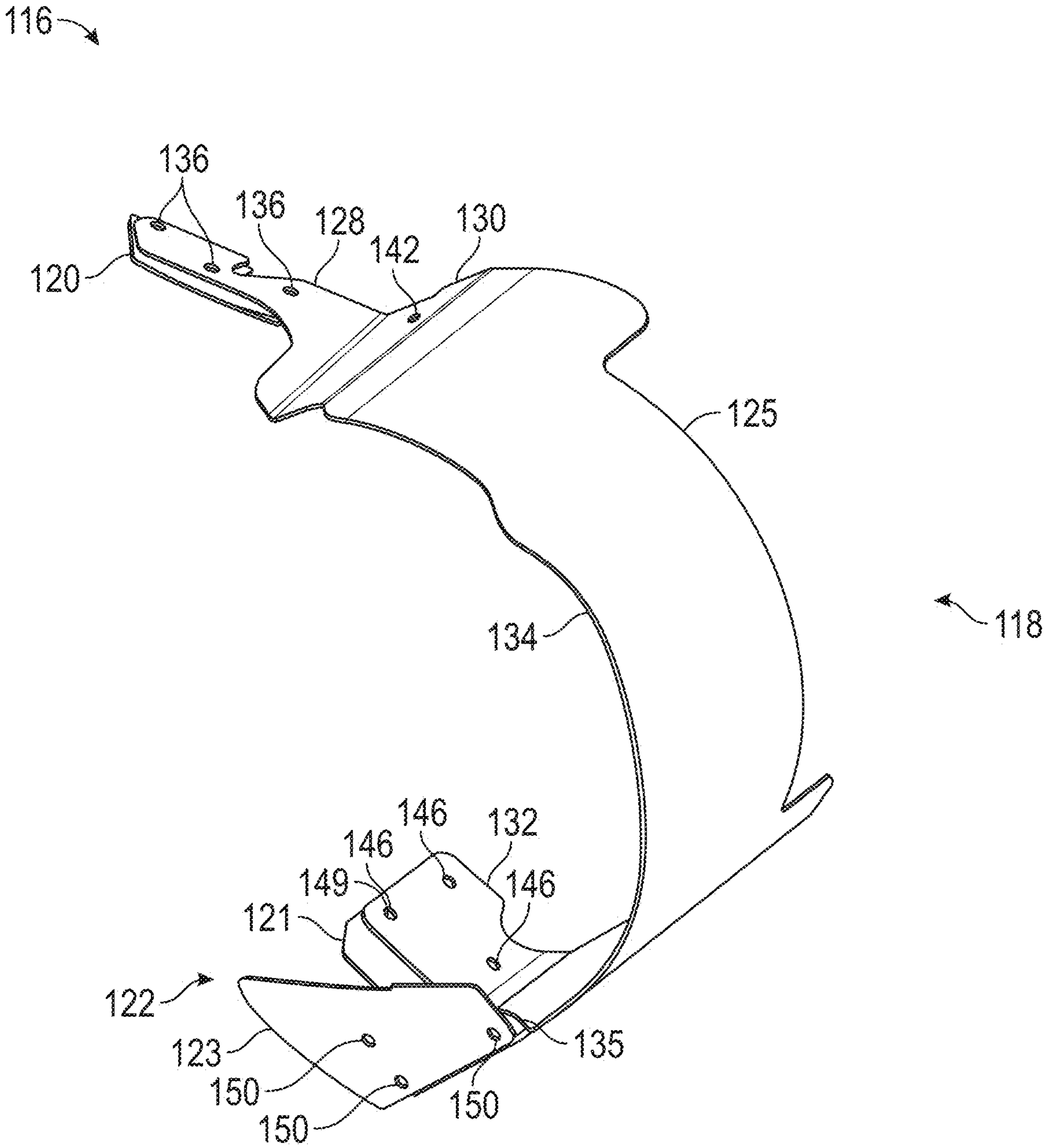
FIG. 6A-6X are various views of a clutch guard of the clutch assembly of FIG. 3, according to an exemplary embodiment.
Figure 6B:
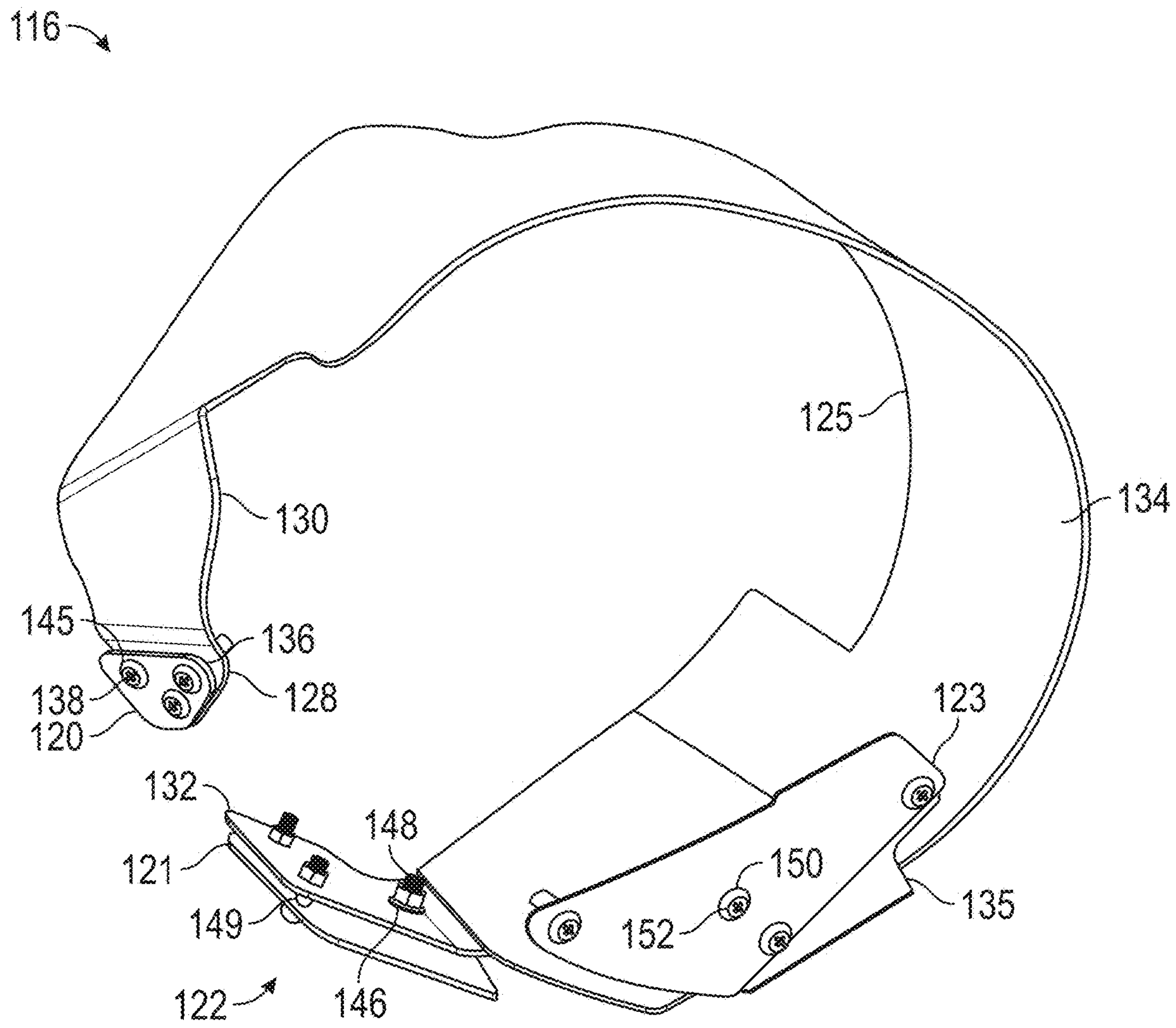
Figure 6C:
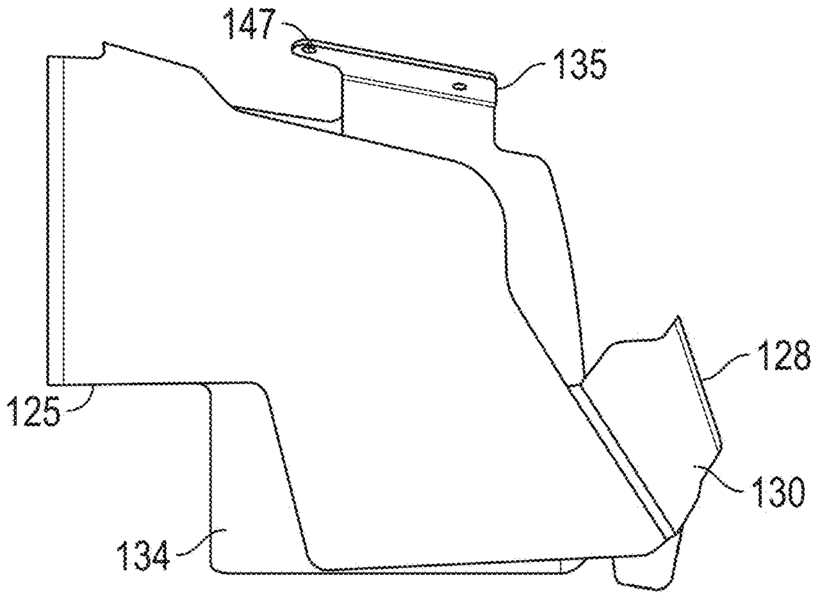
Figure 6D:
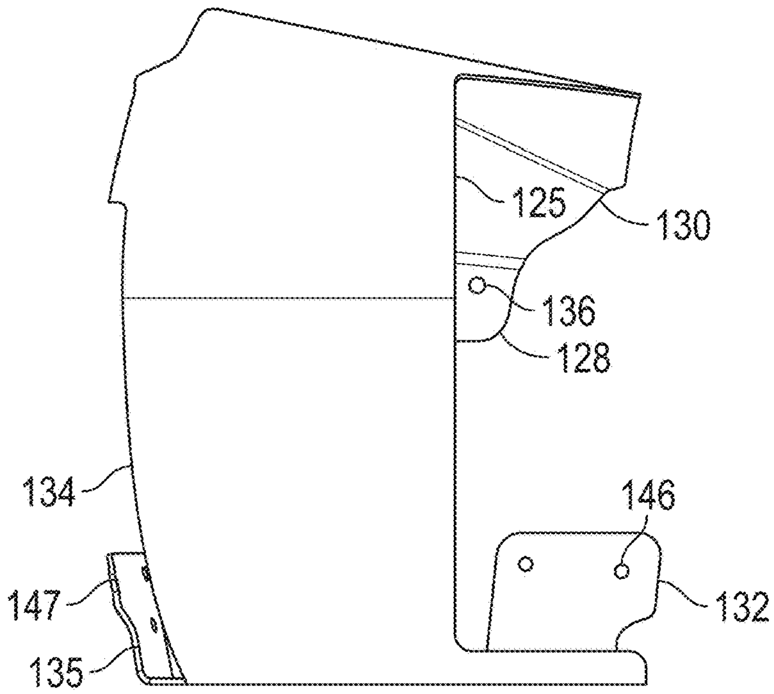
Figure 6E:
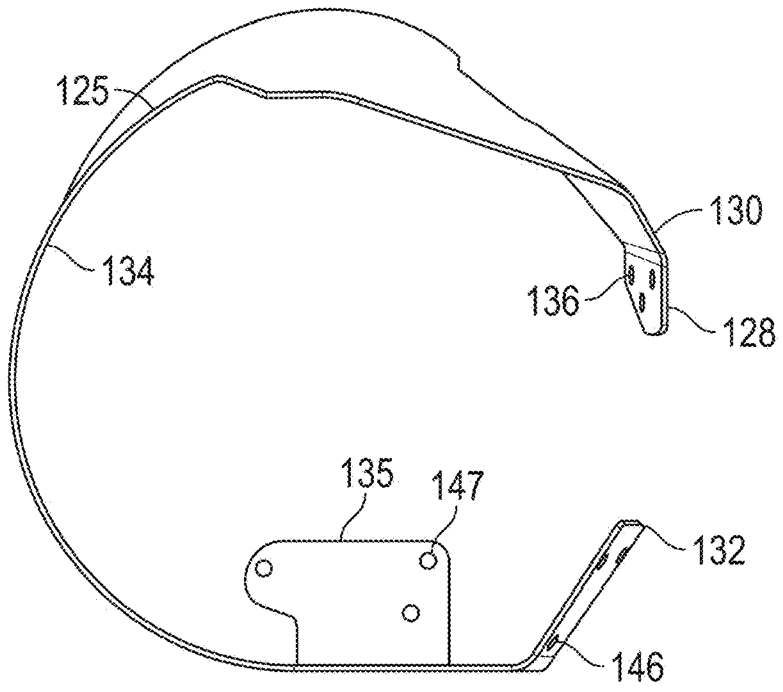
Figure 6F:
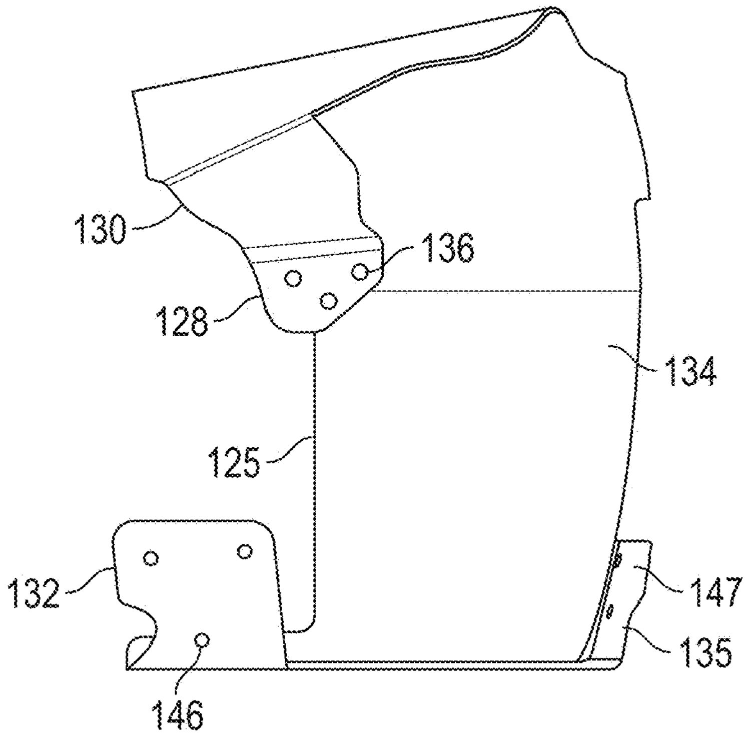
Figure 6G:
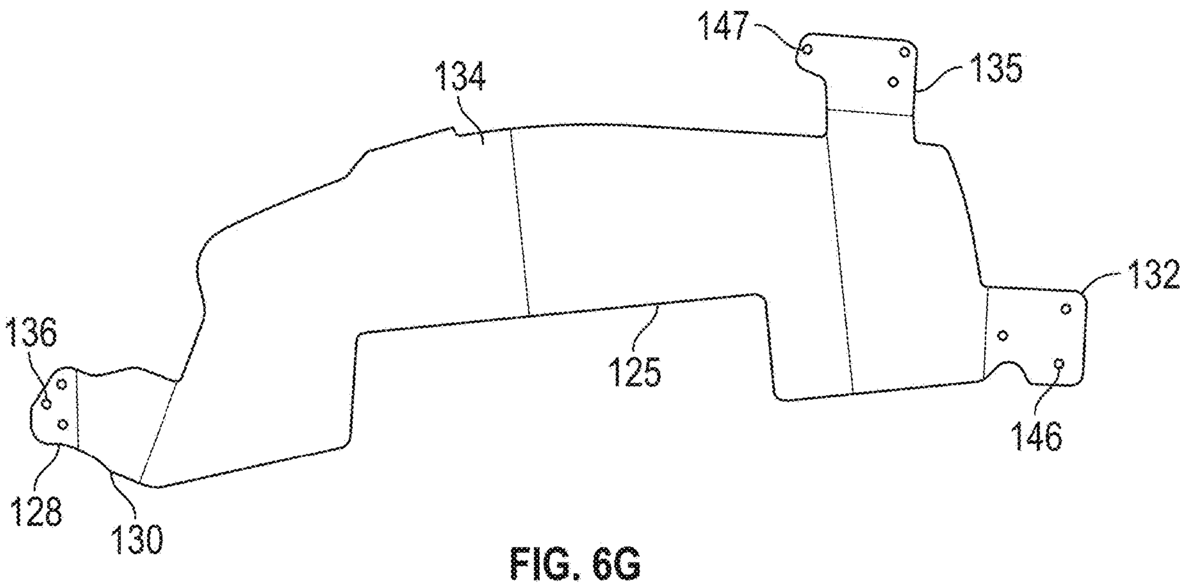
Figure 6H:
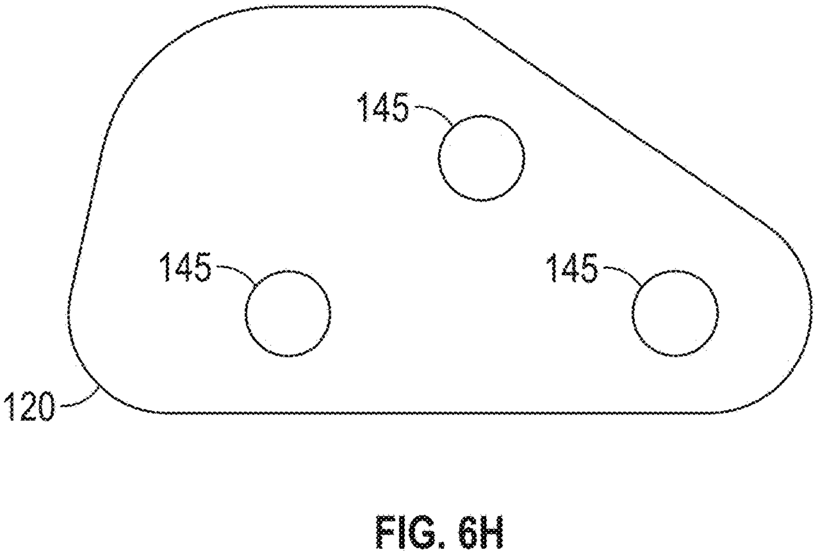
Figure 6I:
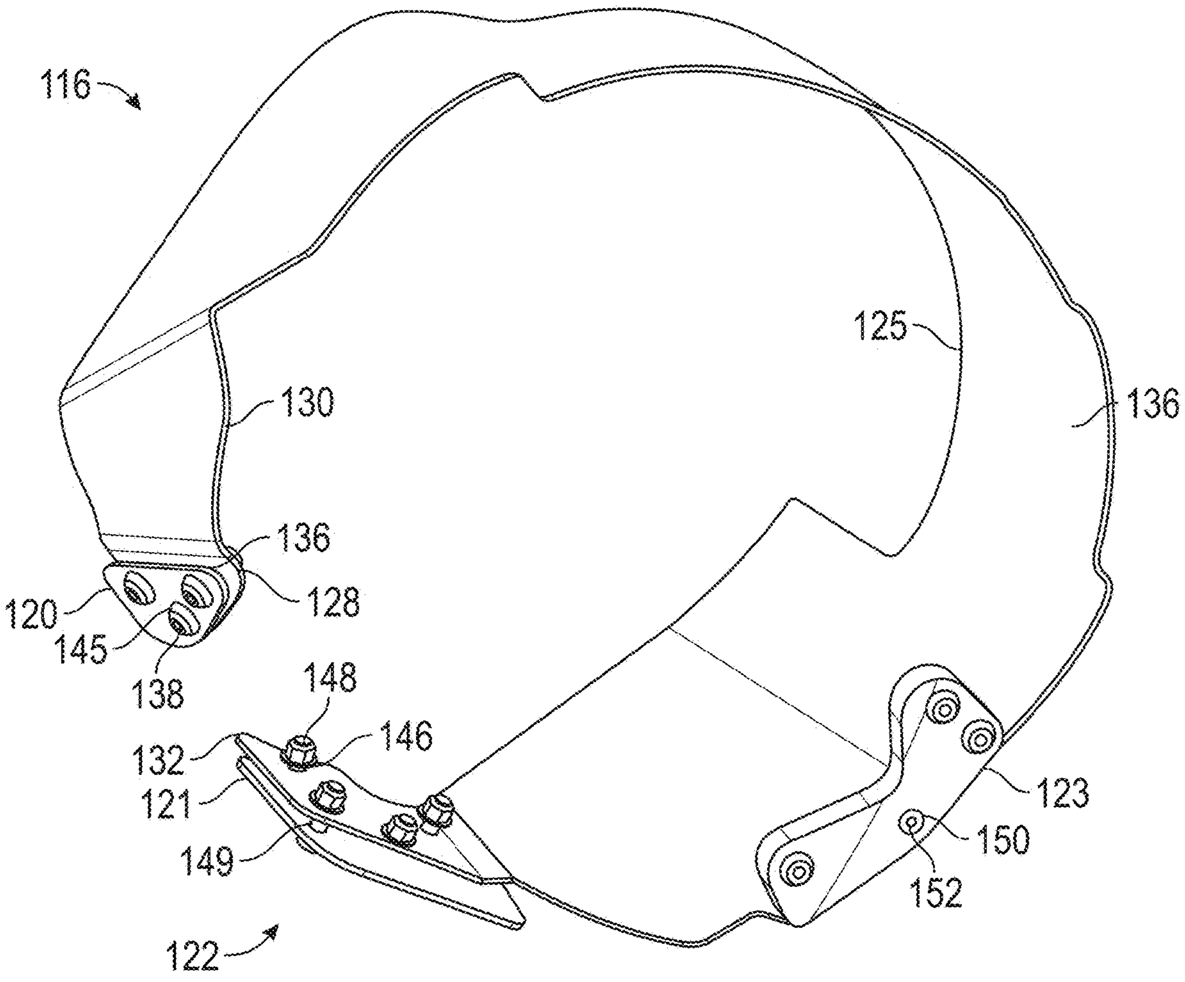
Figure 6J:
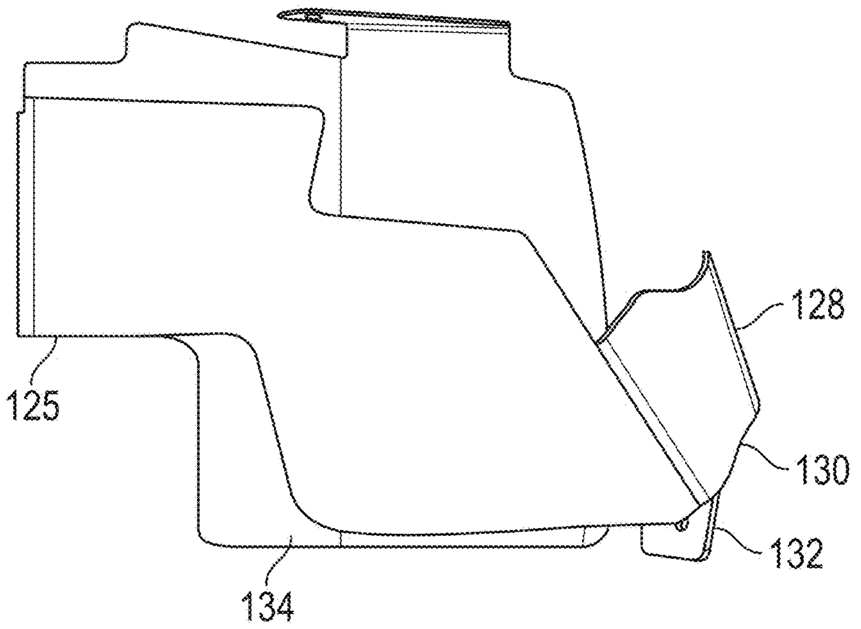
Figure 6K:
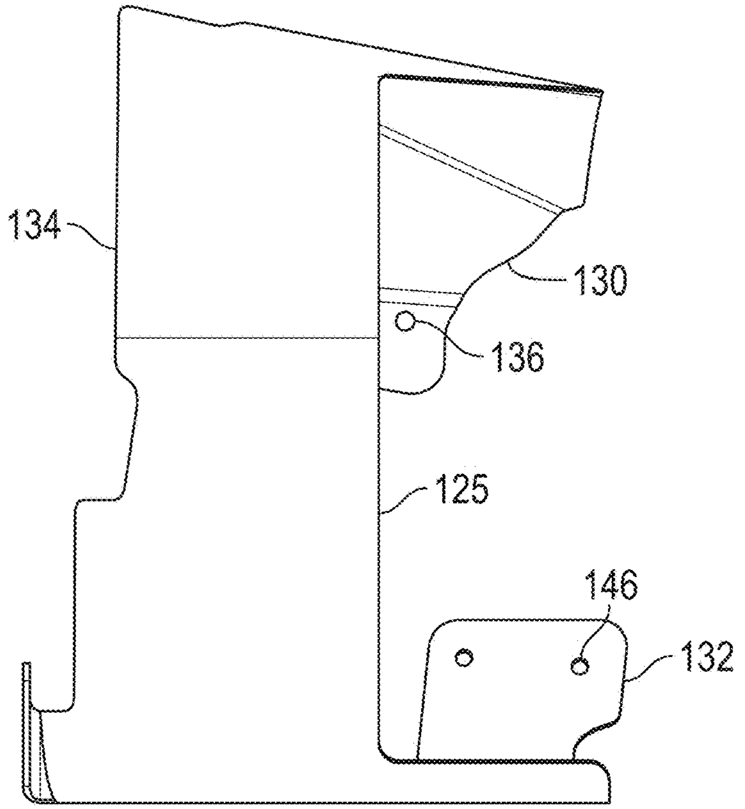
Figure 6L:
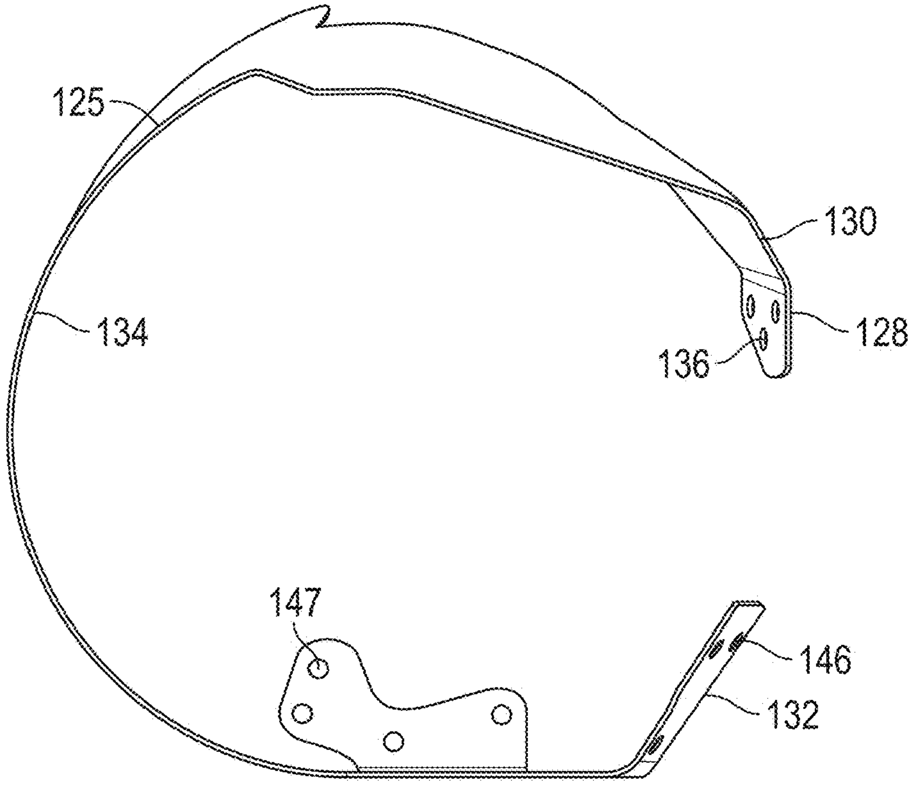
Figure 6M:
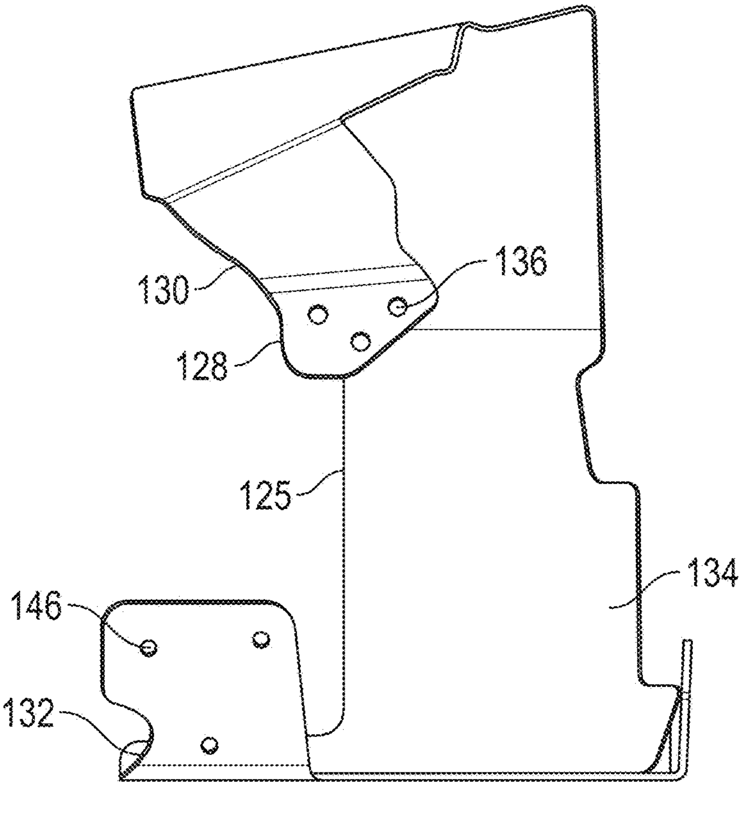
Figure 6N:
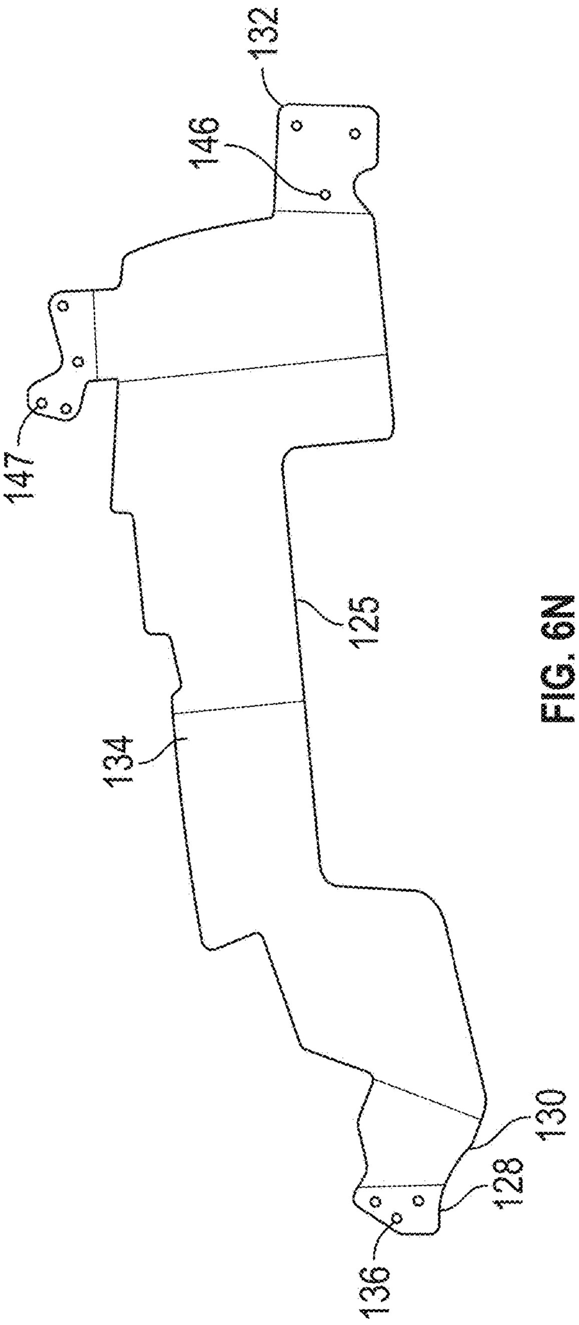
Figure 6O:
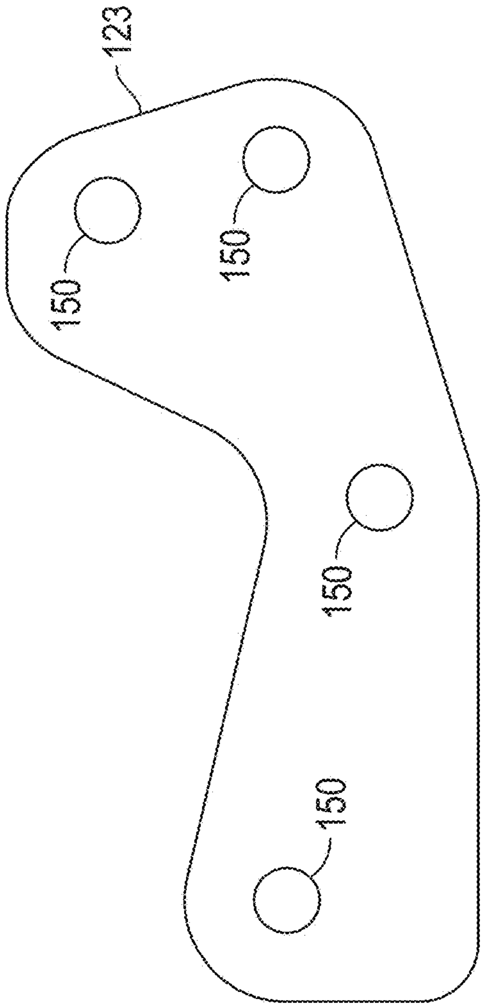
Figure 6P:
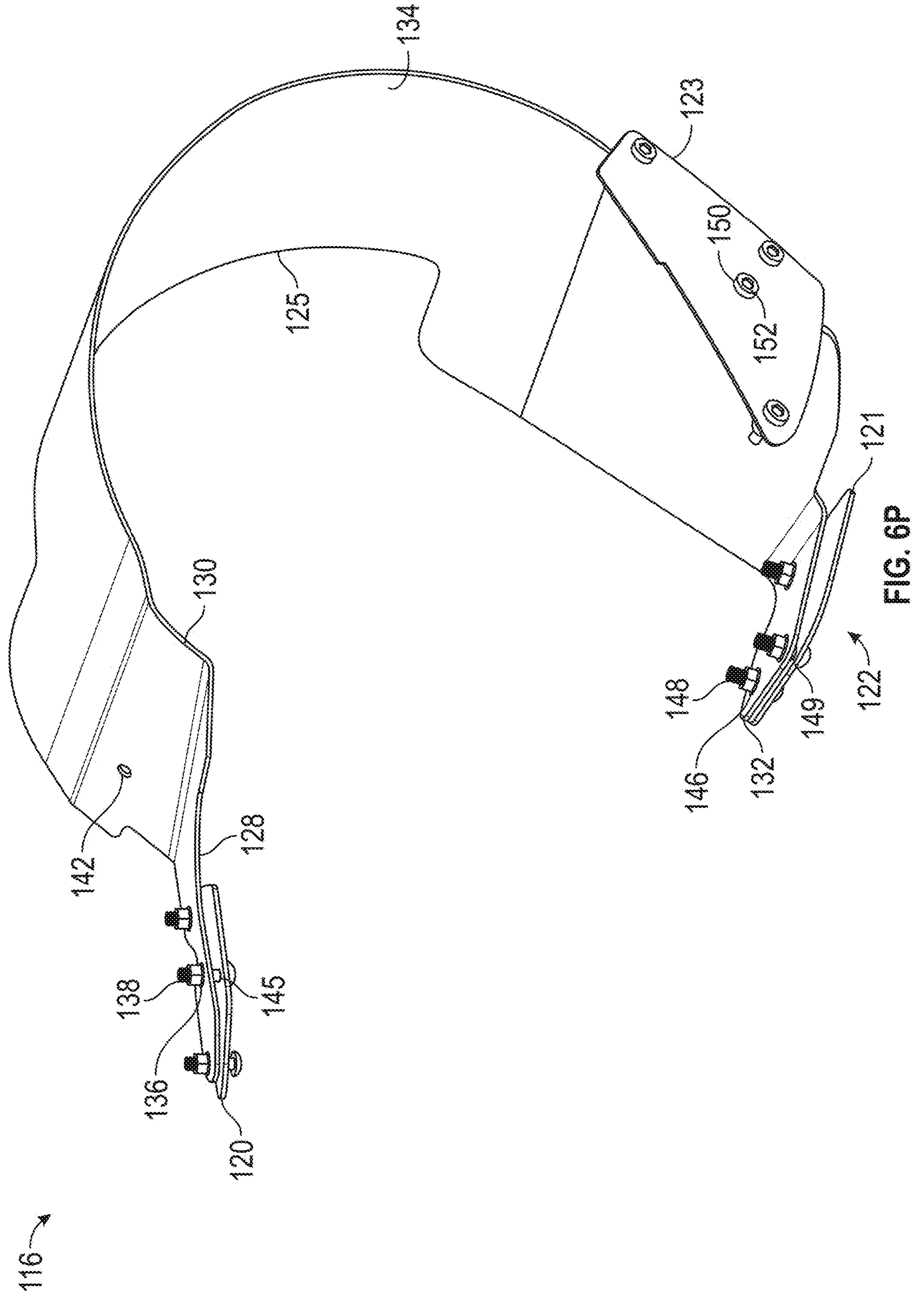
Figure 6Q:
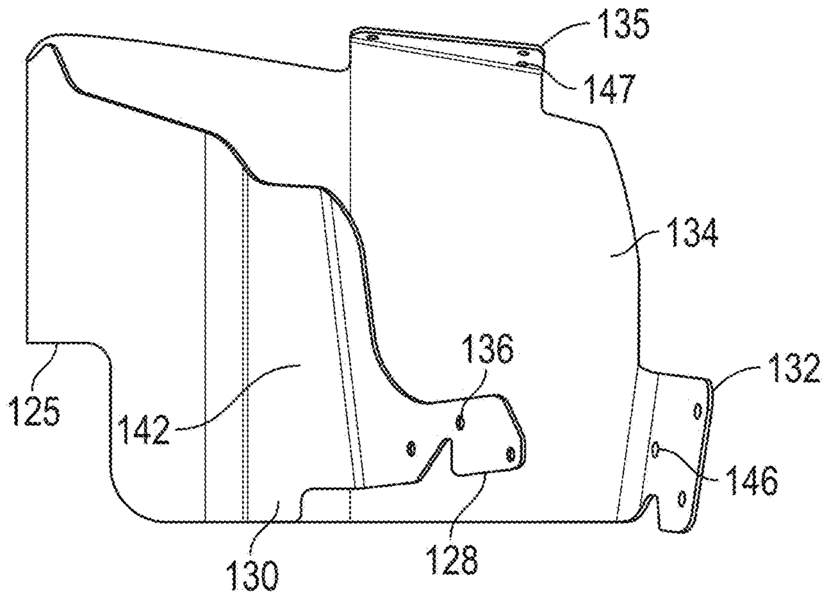
Figure 6R:
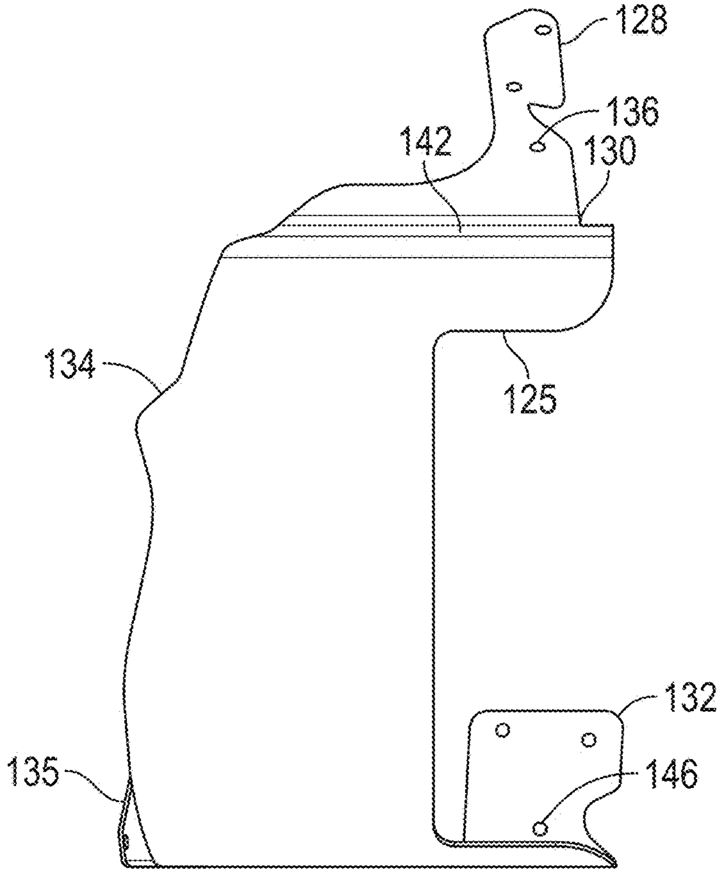
Figure 6S:
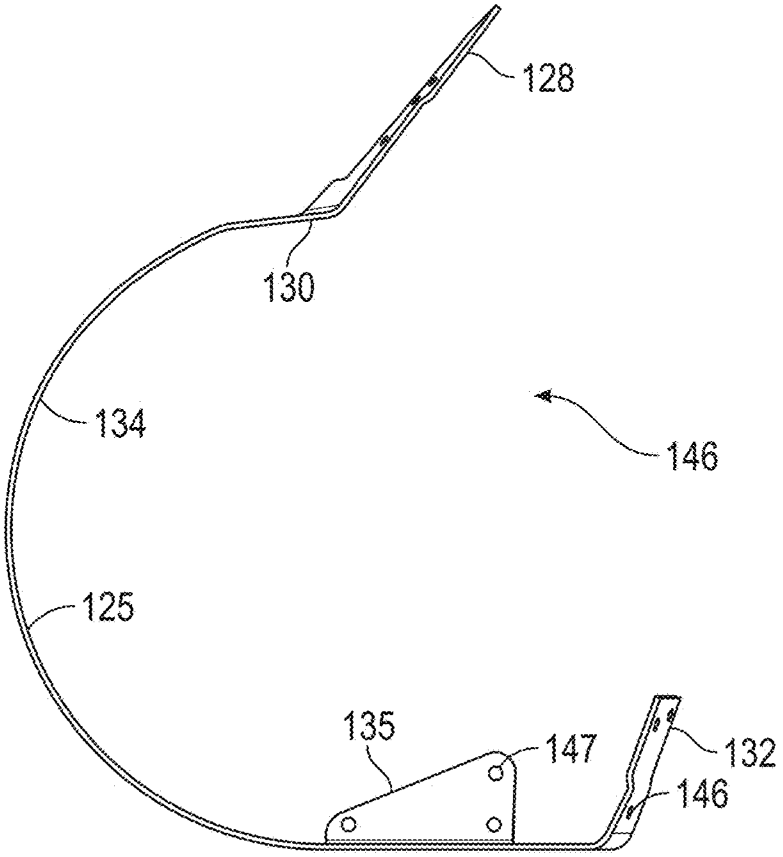
Figure 6T:
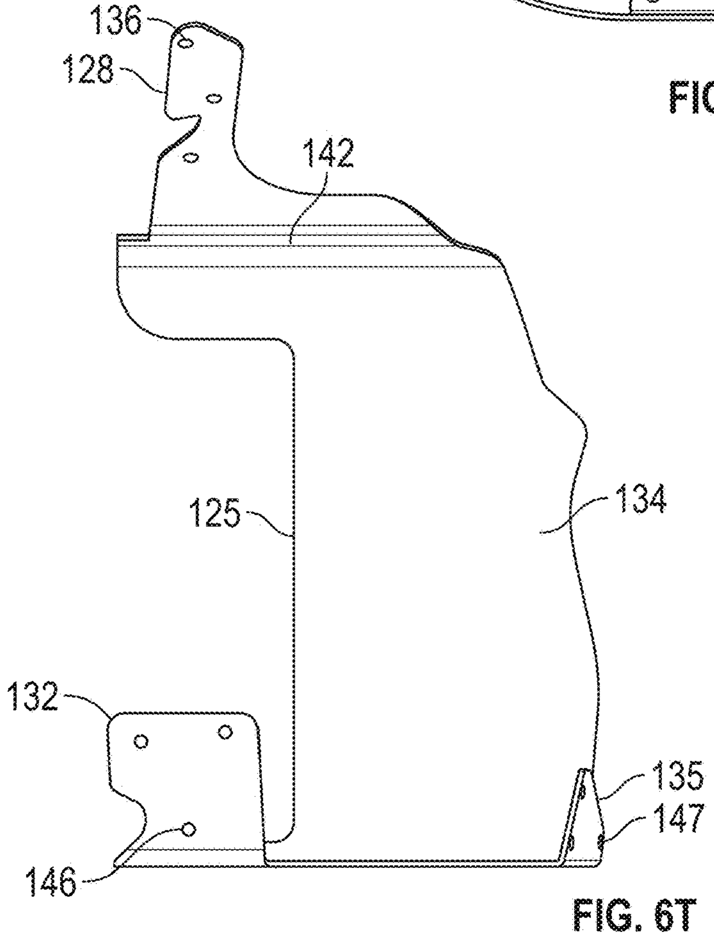
Figure 6U:
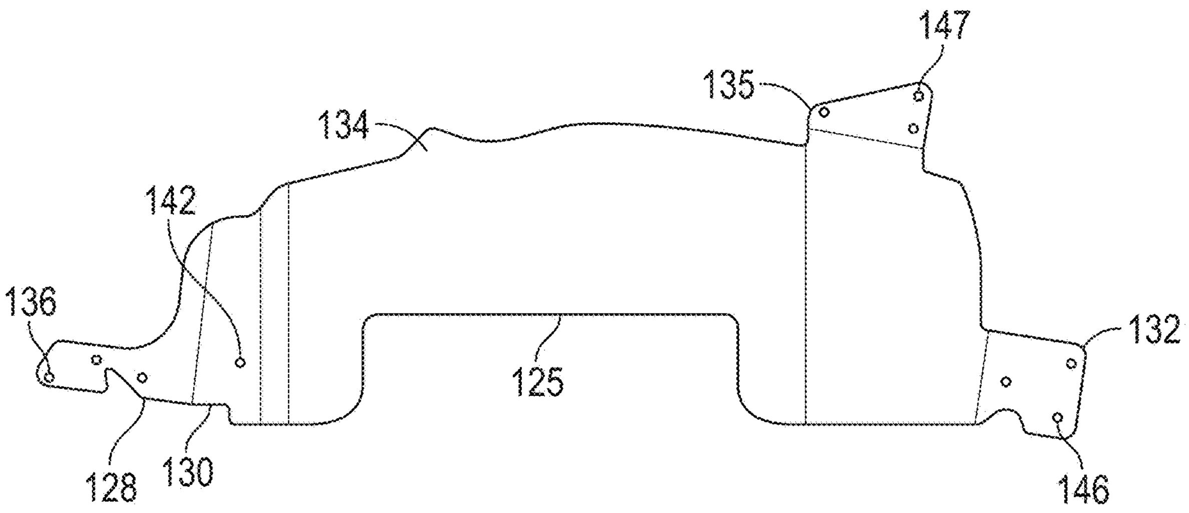
Figure 6V:
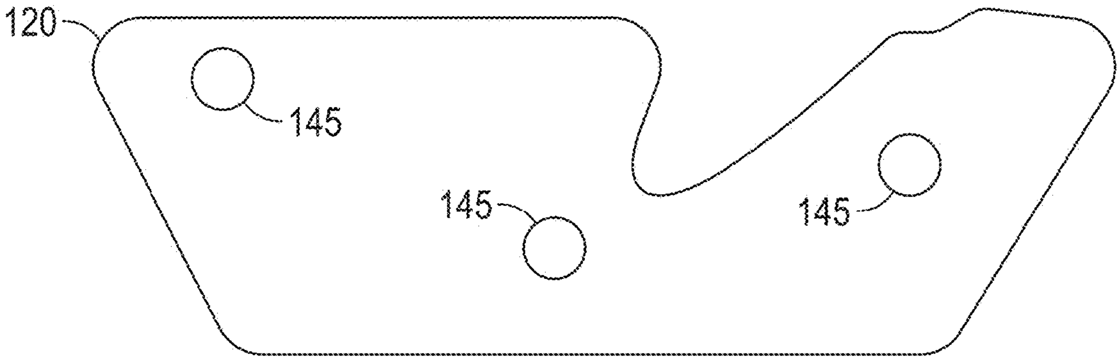
Figure 6W:
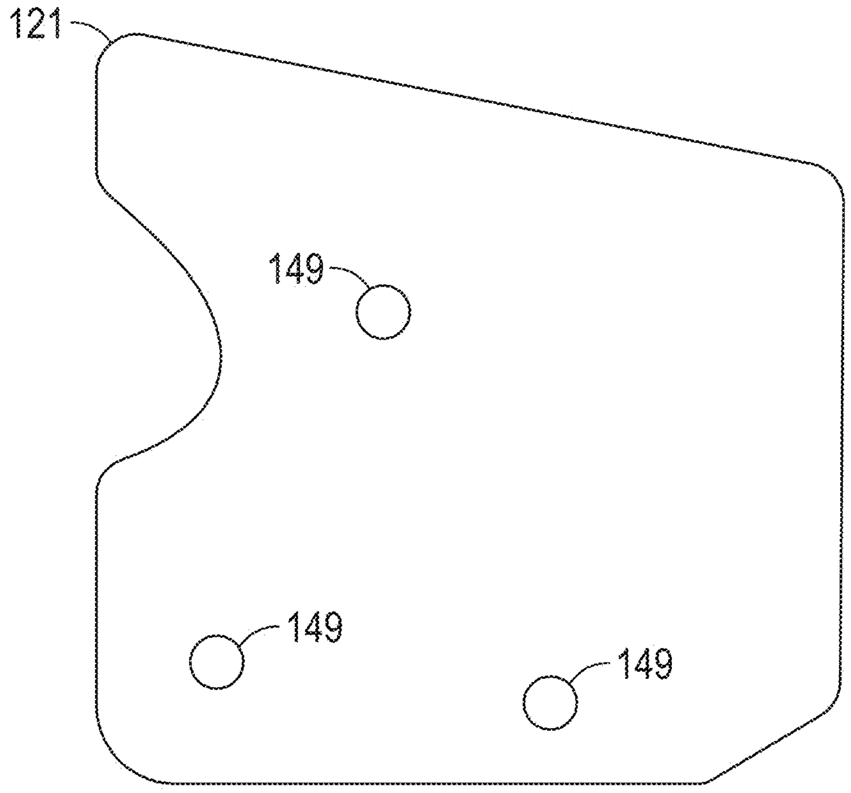
Figure 6X:
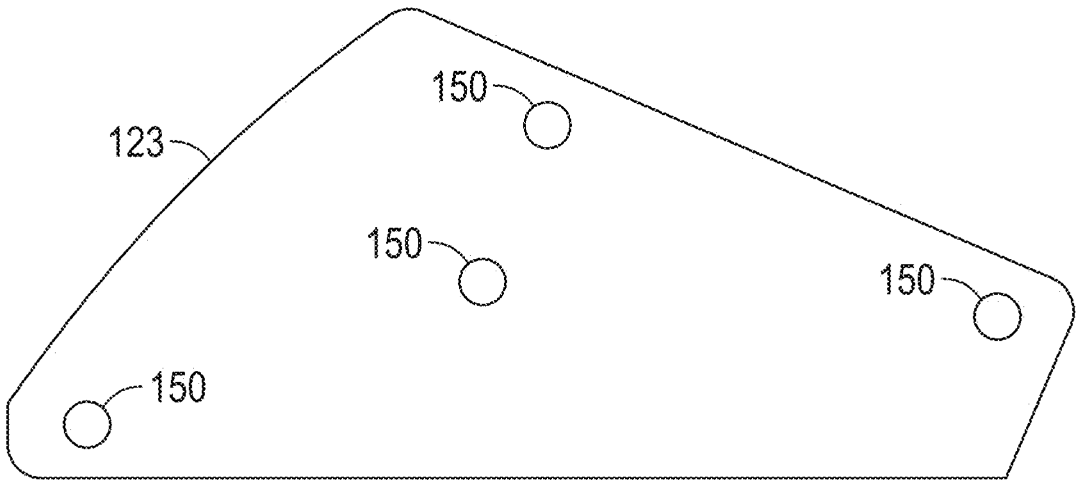

As shown in FIGS. 3-5, the clutch assembly 110 includes a first clutch, shown as primary clutch 112, a second clutch, shown as secondary clutch 114, and a guard assembly, shown as clutch guard assembly 116. The primary clutch 112 defines a first central bore, shown as primary bore 113, which defines a central, lateral, primary axis A and that facilitates coupling the primary clutch 112 to an output of the prime mover 52 (e.g., an output shaft thereof). The output of the prime mover 52 spins components of the primary clutch 112 about the primary axis A when the prime mover 52 is running. According to an exemplary embodiment, the primary clutch 112 is coupled to the secondary clutch 114 by a belt (e.g., a drive belt; a ribbed, rubber belt; etc.), shown as clutch belt 160. The primary clutch 112, when in an engaged configuration and when driven by the prime mover 52, drives the secondary clutch 114 based on engagement of the clutch belt 160 with the primary clutch 112 and the secondary clutch 114.

As shown in FIGS. 3-5, the secondary clutch 114 defines a second central bore, shown secondary bore 115, which defines a central, lateral, secondary axis B and that facilitates coupling the secondary clutch 114 to an input of the rear tractive assembly 56 (e.g., an input shaft thereof, a jackshaft, etc.). The clutch belt 160 of the clutch assembly 110 spins components of the secondary clutch 114 about the secondary axis B when the prime mover 52 is running and the primary clutch 112 is engaged. The secondary clutch 114, when in an engaged configuration and when driven by the prime mover 52 and the primary clutch 112, is configured to drive the rear tractive assembly 56.

According to an exemplary embodiment, the clutch guard assembly 116 is configured to mount or couple to the body 20 and/or the frame 12 of the vehicle 10. As shown in FIGS. 3-6X, the clutch guard assembly 116 includes a curved plate or guard, shown as primary clutch guard 118, a first mounting component, shown as upper mounting plate 120, a second mounting component, shown as lower mounting plate 121, a third mounting component, shown as side mounting plate 123, a first housing portion (e.g., housing guard, secondary clutch guard, etc.), shown as upper housing 124, and a second housing portion (e.g., a housing guard, a belly pan, a component of the body 20, etc.), shown as lower housing 126. As shown in FIGS. 3-5, the upper housing 124 and the lower housing 126 are configured to receive the primary clutch 112, the secondary clutch 114, and the primary clutch guard 118 within an interior cavity or chamber defined therebetween. The primary clutch guard 118 (a) is positioned between the primary clutch 112 and the secondary clutch 114 and (b) at least partially surrounds the primary clutch 112. According to an exemplary embodiment, the clutch guard assembly 116 is configured to reduce the speed of moving debris and direct the moving debris away from a rider (e.g., in a direction away from the occupant seating area 30).

As shown in FIGS. 3-6G, 6I-N, and 6P-6U, the primary clutch guard 118 has (a) a first upper mounting interface, shown as first upper mounting flange 128, positioned at an upper end of the primary clutch guard 118, (b) a second upper mounting interface, shown as second upper mounting flange 130, extending from the first upper mounting flange 128 at an upward angle, (c) a third lower mounting interface, shown as lower mounting flange 132, positioned at a lower end of the primary clutch guard 118, (d) a guard element (e.g., deflection wall, guard plate, curved portion, a curved plate, etc.), shown as guard wall 134, extending between the second upper mounting flange 130 and the lower mounting flange 132 with a curved shape or profile, and (e) a fourth lower mounting interface, shown as side mounting flange 135, extending laterally outward from (e.g., substantially perpendicular to, at an outward angle from) the guard wall 134. As shown in FIGS. 3, 5, 6A-6G, 6I-6N, and 6P-6U, the guard wall 134 has or defines a notched portion (e.g., opening, slot, aperture, etc.), shown as belt channel 125, along at least a portion of a lateral edge thereof. According to an exemplary embodiment, the belt channel 125 is configured (e.g., positioned, sized, etc.) to receive the clutch belt 160 extending between the primary clutch 112 and the secondary clutch 114.

As shown in FIGS. 3, 5-6G, 6I-N, and 6P-6U, the first upper mounting flange 128 defines one or more apertures, shown as first upper mounting flange apertures 136, configured to receive one or more first fasteners (e.g., bolts, screws, rivets, etc.), shown as first mounting fasteners 138, to couple the first upper mounting flange 128 to a first portion of the lower housing 126 (e.g., defining corresponding housing apertures). In some embodiments, the upper mounting plate 120 is configured to be positioned along the first portion of the lower housing 126 (e.g., on an opposing side as the first upper mounting flange 128). As shown in FIGS. 4, 6B-6N, and 6P-6V, the upper mounting plate 120 defines one or more apertures, shown as upper mounting plate apertures 145, configured (e.g., positioned, sized, etc.) to align with the first upper mounting flange apertures 136 and the receive the first mounting fasteners 138. The first mounting fasteners 138 extend through the first upper mounting flange apertures 136 and the upper mounting plate apertures 145 to couple the upper end of the primary clutch guard 118 to the first portion of the lower housing 126. In some embodiments, the upper mounting plate 120 is configured (e.g., shaped, includes corresponding apertures, etc.) based on the configuration (e.g., shape or geometry) of an upper end (e.g., first upper mounting flange 128) of the primary clutch guard 118.

As shown in FIGS. 5-6G, 6I-N, and 6P-6U, the second upper mounting flange 130 defines one or more apertures, shown as second mounting flange aperture 142, configured to receive one or more second fasteners (e.g., bolts, screws, rivets, etc.), shown as second mounting fastener 144, to couple the second upper mounting flange 130 to a portion of the upper housing 124 (e.g., defining one or more corresponding housing apertures).

As shown in FIGS. 5-6G, 6I-N, and 6P-6U, the lower mounting flange 132 defines one or more apertures, shown as lower mounting flange apertures 146, configured to receive one or more third fasteners (e.g., bolts, screws, rivets, etc.), shown as third mounting fasteners 148, to couple the lower mounting flange 132 to a second portion of the lower housing 126 (e.g., defining corresponding housing apertures). In some embodiments, the lower mounting plate 121 is configured to be positioned along the second portion of the lower housing 126 (e.g., on an opposing side as lower mounting flange 132).

As shown in FIGS. 6A, 6B, 6I, 6P, and 6W, the lower mounting plate 121 defines one or more apertures, shown as lower mounting plate apertures 149, configured (e.g., positioned, sized, etc.) to align with the lower mounting flange apertures 146 and to receive the third mounting fasteners 148. The third mounting fasteners 148 extend through the lower mounting flange apertures 146 and the lower mounting plate apertures 149 to couple the lower end (e.g., the lower mounting flange 132) of the primary clutch guard 118 to the second portion of the lower housing 126. In some embodiments, the lower mounting plate 121 is configured (e.g., shaped, includes corresponding apertures, etc.) based on the configuration (e.g., shape or geometry) of the lower mounting flange 132 of the primary clutch guard 118.

As shown in FIGS. 5-6G, 6I-N, and 6P-6U, the side mounting flange 135 defines one or more apertures, shown as side mounting flange apertures 147, configured to receive one or more fourth fasteners (e.g., bolts, screws, rivets, etc.), shown as fourth mounting fasteners 152, to couple the side mounting flange 135 to a third portion of the lower housing 126 (e.g., defining corresponding housing apertures). In some embodiments, the side mounting plate 123 is configured to be positioned along the third portion of the lower housing 126 (e.g., on opposing side as the side mounting flange 135).

As shown in FIGS. 3-6B, 6I, 6O, 6P, and 6X, the side mounting plate 123 defines one or more apertures, shown as side mounting plate apertures 150, configured (e.g., positioned, sized, etc.) to align with the side mounting flange apertures 147 and to receive the fourth mounting fasteners 152. The fourth mounting fasteners 152 extend through the side mounting flange apertures 147 and the side mounting plate apertures 150 to couple a side portion (e.g., the side mounting flange 135) of the primary clutch guard 118 to the side mounting plate 123 and the third portion of the lower housing 126 (e.g., defining corresponding housing apertures). In some embodiments, the side mounting plate 123 is configured (e.g., shaped, includes corresponding apertures, etc.) based on the configuration (e.g., shape or geometry) of the side mounting flange 135 of the primary clutch guard 118.

In some embodiments, the lower mounting plate 121 and the side mounting plate 123 are integrally formed with one another to form a mounting bracket 122. In some embodiments, the lower mounting plate 121 and the side mounting plate 123 are separate from one another (e.g., individual components of the mounting bracket 122).

As shown in FIGS. 3-5, the primary clutch guard 118 is configured (e.g., sized, shaped, etc.) to at least partially surround the primary clutch 112. More specifically, the guard wall 134 defines an arc that extends (e.g., wraps) around the primary axis A of the primary clutch 112 and the outer housing thereof. As shown in FIGS. 4 and 5, the first upper mounting flange 128 and the lower mounting flange 132 are mounted to the lower housing 126 longitudinally forward of the primary axis A such that the arc of the primary clutch guard 118 curves in a direction opposite the occupant seating area 30 and extends at least partially longitudinally forward of the primary axis (i.e., more than one-half of the primary clutch 112 is surrounded by the primary clutch guard 118).

According to an exemplary embodiment, the primary clutch guard 118 is positioned and configured to redirect objects debris within the interior cavity or chamber of the clutch guard assembly 116 to travel along a path (e.g., a tangential path) defined by the arc of the guard wall 134 of the primary clutch guard 118 between the second upper mounting flange 130 and the lower mounting flange 132 (i.e., in a direction away from the occupant seating area 30). Accordingly, the path defined by the primary clutch guard 118 is configured to capture the debris as the debris engages with the guard wall 134 to slow the movement (e.g., energy) of and/or redirect the debris. According to an exemplary embodiment, the primary clutch guard 118 is configured (e.g., positioned, shaped, structured, designed, etc.) to direct the debris in a direction away from the occupant seating area 30. In some embodiments, the primary clutch guard 118 is made of metal, such as steel, or other material with material properties that allow the primary clutch guard 118 to sufficiently deflect the debris.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single-or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle controller 100, the clutch assembly 110, etc.) as shown in the various exemplary embodiments is illustrative only. Additionally, any element disclosed in one embodiment may be incorporated or utilized with any other embodiment disclosed herein.

The invention claimed is:

1. A clutch assembly for a snowmobile, the clutch assembly comprising:

a first clutch defining a central axis, the first clutch configured to be coupled to a prime mover of the snowmobile;

a second clutch coupled to the first clutch, the second clutch configured to be coupled to a tractive assembly of the snowmobile; and a clutch guard positioned between the first clutch and the second clutch, the clutch guard including:

a guard wall having a curved profile extending at least partially around the first clutch;

a first mounting flange positioned at or proximate a first end of the guard wall, the first mounting flange configured to couple to a first mounting interface; and a second mounting flange positioned at or proximate a second end of the guard wall, the second mounting flange configured to couple to a second mounting interface;

wherein the first mounting flange and the second mounting flange are positioned longitudinally forward of the central axis.

2. The clutch assembly of claim 1, further comprising a belt coupling the first clutch and the second clutch together.

3. The clutch assembly of claim 2, wherein the guard wall defines a notch extending at least partially between the first end and the second end, wherein the belt extends through the notch.

4. The clutch assembly of claim 1, wherein the clutch guard includes a third mounting flange positioned along the guard wall between the first mounting flange and the second mounting flange, the third mounting flange configured to couple to a third mounting interface.

5. The clutch assembly of claim 4, wherein the clutch guard includes a fourth mounting flange positioned along the guard wall between the first mounting flange and the third mounting flange, the fourth mounting flange configured to couple to a fourth mounting interface.

6. The clutch assembly of claim 5, wherein the fourth mounting interface is on a different component of the snowmobile than the first mounting interface, the second mounting interface, and the third mounting interface.

7. The clutch assembly of claim 4, wherein the third mounting flange extends from an edge of the guard wall, wherein the first mounting flange extends from the first end of the guard wall, and wherein the second mounting flange extends from the second end of the guard wall.

8. The clutch assembly of claim 1, further comprising a housing at least partially surrounding the first clutch and the second clutch, the housing including a first housing portion and a second housing portion separate from the first housing portion, wherein the first mounting interface and the second mounting interface are disposed along the first housing portion.

9. The clutch assembly of claim 8, wherein the clutch guard includes a third mounting flange positioned along the guard wall between the first mounting flange and the second mounting flange, wherein the third mounting flange is configured to couple to a third mounting interface, and wherein the third mounting interface is disposed along the second housing portion.

10. A clutch assembly comprising:

a first clutch;

a second clutch;

a clutch guard positioned between the first clutch and the second clutch, the clutch guard having a curved profile extending at least partially around the first clutch, the curved profile defining a notch extending at least partially therealong; and a belt coupling the first clutch to the second clutch, the belt extending through the notch.

11. The clutch assembly of claim 10, wherein the first clutch defines a central axis, the second clutch is positioned longitudinally rearward of the first clutch, and wherein a first end and a second end of the curved profile are positioned longitudinally forward of the central axis.

12. The clutch assembly of claim 10, wherein the clutch guard includes a first mounting interface positioned at or proximate a first end thereof, a second mounting interface positioned at or proximate a second end thereof, and a third mounting interface positioned between the first mounting interface and the second mounting interface, wherein the first mounting interface and the second mounting interface are configured to couple to a first component of a vehicle, and wherein the third mounting interface is configured to couple to a second component of the vehicle.

13. The clutch assembly of claim 10, further comprising a housing at least partially surrounding the first clutch and the second clutch, the housing including a first housing portion and a second housing portion separate from the first housing portion, wherein the clutch guard includes a first mounting interface coupled to the first housing portion and a second mounting interface coupled to the second housing portion.

14. The clutch assembly of claim 13, wherein the clutch guard includes a third mounting interface coupled to the first housing portion.

15. The clutch assembly of claim 14, wherein the second mounting interface is positioned between the first mounting interface and the third mounting interface, and wherein the notch is positioned between the second mounting interface and the third mounting interface.

16. The clutch assembly of claim 10, wherein the notch is positioned along a first edge of the clutch guard, and wherein the clutch guard includes a mounting flange extending from an opposing second edge thereof.

17. A clutch device comprising:

a clutch guard configured to be positioned between (a) a first clutch coupled to a prime mover of an off-road vehicle and (b) a second clutch coupled to a tractive assembly of the off-road vehicle;

wherein:

the clutch guard having a curved profile configured to extend at least partially around the first clutch such that a first end and a second end of the curved profile are positioned longitudinally forward of a central axis of the first clutch; and the curved profile defines a notch extending at least partially therealong.

18. The clutch device of claim 17, wherein the clutch guard includes a first mounting interface positioned at or proximate the first end, a second mounting interface positioned at or proximate the second end, and a third mounting interface positioned between the first mounting interface and the second mounting interface.

19. The clutch device of claim 18, wherein the first mounting interface and the second mounting interface are configured to couple to a first component of the off-road vehicle, and wherein the third mounting interface is configured to couple to a second component of the off-road vehicle.

20. The clutch device of claim 18, wherein the notch is positioned between the second mounting interface and the third mounting interface.

* * * * *